（12）United States Patent
Lucas et al.

(10) Patent No.: US 6,275,501 B1
(45) Date of Patent: Aug. 14, 2001

(54) MEDIA ACCESS CONTROLLER CAPABLE OF CONNECTING TO A SERIAL PHYSICAL LAYER DEVICE AND A MEDIA INDEPENDENT INTERFACE (MII) PHYSICAL LAYER DEVICE

(75) Inventors: Mark C. Lucas, Auburn; Eric McLaughlin, Grass Valley; Christian Warling, Rocklin, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/063,686

(22) Filed: Apr. 21, 1998

(51) Int. Cl.[7] .................................................. H04L 12/26
(52) U.S. Cl. ............................ 370/463; 370/389; 370/465
(58) Field of Search ..................... 370/463, 465, 370/389, 225, 315, 390, 402, 426, 443, 442; 709/250, 223, 229; 345/99

(56) References Cited

U.S. PATENT DOCUMENTS

| | | | |
|---|---|---|---|
| 5,821,910 | * 10/1998 | Shay | 345/99 |
| 5,852,609 | * 12/1998 | Adams, III et al. | 370/465 |
| 5,995,514 | * 11/1999 | Lo | 370/463 |
| 6,044,087 | * 3/2000 | Muller et al. | 370/463 |
| 6,061,362 | * 5/2000 | Muller et al. | 370/463 |
| 6,076,115 | * 6/2000 | Sambamurthy et al. | 709/250 |

OTHER PUBLICATIONS

IEEE Standard 802.3u, 1995, Chapter 22 (pp. 27–80).*
IEEE Standard 802.3u, 1995, Chapter 22 (pp. 27–80).
Preliminary Data Sheet, 8501/8502 Ethernet MII to AUI Interface Adapter, Seeq Technology, INc. Jul. 14, 1997, pp. 1–56.

* cited by examiner

Primary Examiner—Dang Ton
Assistant Examiner—Anthony Ton

(57) ABSTRACT

A network node includes a serial physical sublayer (PHY) chip, a parallel PHY chip, and a media access control (MAC) chip. The serial physical sublayer chip, includes a single bit transmit data input, a single bit receive data output, and serial PHY control signal input/output (I/O) lines. The parallel PHY chip includes a multi-bit transmit data input, a multi-bit receive data output, and parallel PHY control signal I/O lines. The MAC chip includes a multi-bit transmit data output, a multi-bit receive data input and parallel control signal I/O lines. The multi-bit transmit data output is connected to the multi-bit transmit data input. One bit of the multi-bit transmit data output is connected to the single bit transmit data input. The multi-bit receive data input is connected to the multi-bit receive data output. One bit of the multi-bit receive data input is connected to the single bit receive data output. The parallel control signal I/O lines are connected to the parallel PHY control signal I/O lines. A subset of the parallel control signal I/O lines are connected to the serial PHY control signal I/O lines.

20 Claims, 4 Drawing Sheets

MEDIA ACCESS CONTROLLER CAPABLE OF CONNECTING TO A SERIAL PHYSICAL LAYER DEVICE AND A MEDIA INDEPENDENT INTERFACE (MII) PHYSICAL LAYER DEVICE

BACKGROUND

The present invention concerns data transfer over a network and pertains particularly to a media access controller capable of connecting to a serial physical layer device and a media independent interface physical layer device.

The IEEE 802.3 specification has been created and adopted as a method of sending information between computers and other devices. The IEEE 802.3u specification extended the technology for 100 megabits per second networking.

Within the IEEE 802.3 specification a physical sublayer (PHY) includes a Physical Coding Sublayer (PCS), a Physical Media Access (PMA) sublayer, and a Physical Media Dependent (PMD) sublayer. The PCS defines how data is encoded and decoded as well as how the Carrier Sense (CS) and Collision Detection (CD) functions work. The PCS also defines the interface between higher and lower layers in the protocol specification. The PMA defines the mapping of code bits, generation of a control signal (link_status), generation of control signals to the PCS, and clock recovery. The control signal (link_status) indicates the availability of the PMD. The control signals to the PCS indicate Carrier Sense, Collision Detection and Physical Layer Errors. The PMD defines the signaling method and parameters for the various physical parameters that are necessary to address the link's physical requirements.

The PHY is generally placed on a dedicated integrated circuit (chip). The PHY communicates with a separate media access control (MAC) integrated circuit. The MAC provides an interface to a host system. Some PHY chips provide connectivity for 10Base2 devices. For example, a PHY chip which provides connectivity to an attachment unit interface (AUI) (for 10Base2 connectivity) is available as part LXT908 from Level One Communications, Inc., having a business address of 9750 Goethe Road, Sacramento, Calif. 95827. PHYs which provide 10Base2 connectivity typically interface with a serial MAC chip.

With the advent of the IEEE 802.3u specification, some PHY chips provide connectivity to 10/100T networks. For example, a PHY chip which provides connectivity to 10/100 megabit networks is available as part LXT970 from Level One Communications, Inc. In order to connect a MAC chip to multiple PHY chips which can provide connectivity to 10/100 megabit networks or other types of media, a media independent interface (MII) bus was created. A PHY chip connected to an MII bus transmits to and receives data from a MAC chip in four bit groupings (nibbles) of data. For more information on construction of an MII bus, see Chapter 22 of the IEEE 802.3u specification.

Generally, to provide 10Base2 along with 10/100T connectivity, it is necessary to utilize two separate MACs. However Seeq Technology Inc. having a business address of 47200 Bayside Pky, Fremont, Calif. 94538-6567 has designed a specialized 10Base2 PHY which can communicate with a MAC over an MII bus. However, this solution requires the use of a specialized 10Base2 PHY.

SUMMARY OF THE INVENTION

In accordance with the preferred embodiment of the present invention, a network node is connectable to a network. The network node includes a serial physical sublayer (PHY) chip, a parallel PHY chip, and a media access control (MAC) chip. For example, the parallel PHY chip is a media independent interface (MII) PHY chip. The serial PHY chip, includes a single bit transmit data input, a single bit receive data output, and serial PHY control signal input/output (I/O) lines. The parallel PHY chip includes a multi-bit transmit data input, a multi-bit receive data output, and parallel PHY control signal I/O lines. The media access control chip includes a multi-bit transmit data output, a multi-bit receive data input and parallel control signal I/O lines. The multi-bit transmit data output is connected to the multi-bit transmit data input. One bit of the multi-bit transmit data output is connected to the single bit transmit data input. The multi-bit receive data input is connected to the multi-bit receive data output. One bit of the multi-bit receive data input is connected to the single bit receive data output. The parallel control signal I/O lines are connected to the parallel PHY control signal I/O lines.

In the preferred embodiment, the serial PHY control signal I/O lines are connected to a subset, but not all, of the parallel control signal I/O lines. Also, in the preferred embodiment, the single bit transmit data input, the single bit receive data output and the serial PHY control signal I/O lines of the serial PHY chip can be electrically isolated when data is being transmitted between the parallel PHY chip and the MAC chip.

Also, in the preferred embodiment, the MAC chip additionally includes a receive clock line on which is placed a receive clock signal. A receive shift register within the MAC chip is connected to the multi-bit receive data input, and to the receive clock signal. When the MAC chip receives data from the parallel PHY chip, the data is clocked into the receive shift register four bits at a time. When the MAC chip receives data from the serial PHY chip, the data from the serial PHY chip is clocked into the receive shift register one bit at a time. When the MAC chip receives data from the parallel PHY chip, the receive clock signal has a first frequency (e.g. 2.5 MHz or 25 MHz). When the MAC chip receives data from the serial PHY chip, the receive clock signal has a second frequency (e.g., 10 MHz).

Also, in the preferred embodiment, the MAC chip additionally includes a transmit clock line on which is placed a transmit clock signal. A transmit shift register within the MAC chip is connected to the multi-bit transmit data output, and to the transmit clock signal. When the MAC chip sends data to the parallel PHY chip, the data is clocked out of the transmit shift register four bits at a time. When the MAC chip sends data to the serial PHY chip, the data sent to the serial PHY chip is clocked out of the transmit shift register one bit at a time. The transmit clock signal has a first frequency (e.g. 2.5 MHz or 25 MHz) when the MAC chip transmits data to the parallel PHY chip, and has a second frequency (e.g., 10 MHz) when the MAC chip transmits data to the serial PHY chip.

The present invention reduces the cost of providing for simultaneous support of 10T, 100T and 10 base 2 connectivity. A single network card with only one MAC chip can be designed to provide all three connection options. Any MII compatible PHY can be connected simultaneously with any serial PHY. By connecting two PHY chips to a single MAC chip, it is possible to save printed circuit board space, and to conserve power consumption. Since the present invention allows compatibility with any serial PHY, it allows the use of any competitively priced 10Base2 PHY.

DESCRIPTION OF THE PREFERRED EMBODIMENT

Figure 1:
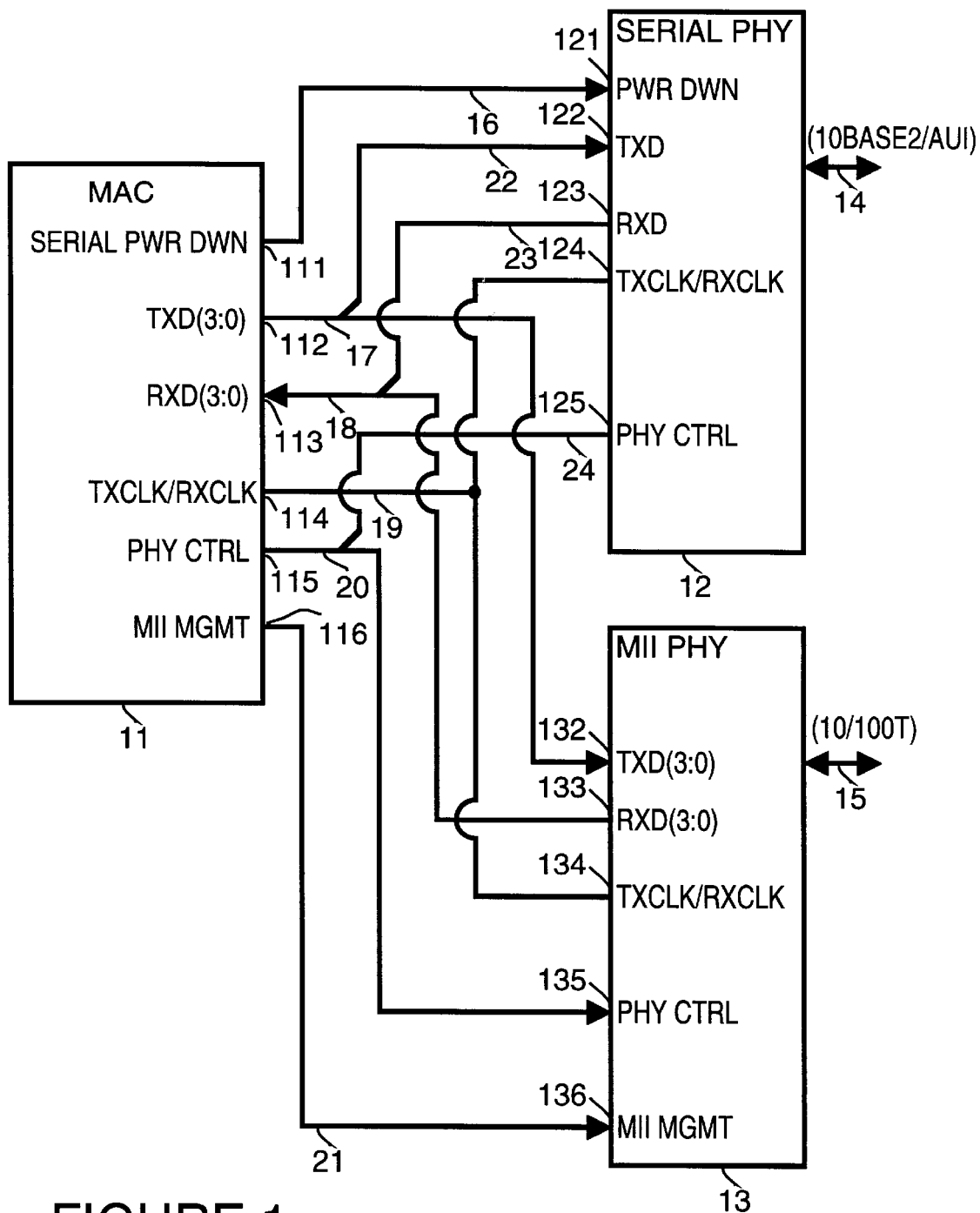
FIG. 1 is a simplified block diagram which shows a media access control (MAC) integrated circuit connected to one physical sublayer (PHY) through a media independent interface (MII) bus and to another physical sublayer through a serial interface in accordance with a preferred embodiment of the present invention.

FIG. 1 is a simplified block diagram which shows a media access control (MAC) integrated circuit connected to one physical sublayer (PHY) through a media independent interface (MII) bus and to another PHY through a serial interface in accordance with a preferred embodiment of the present invention.

Figure 2:
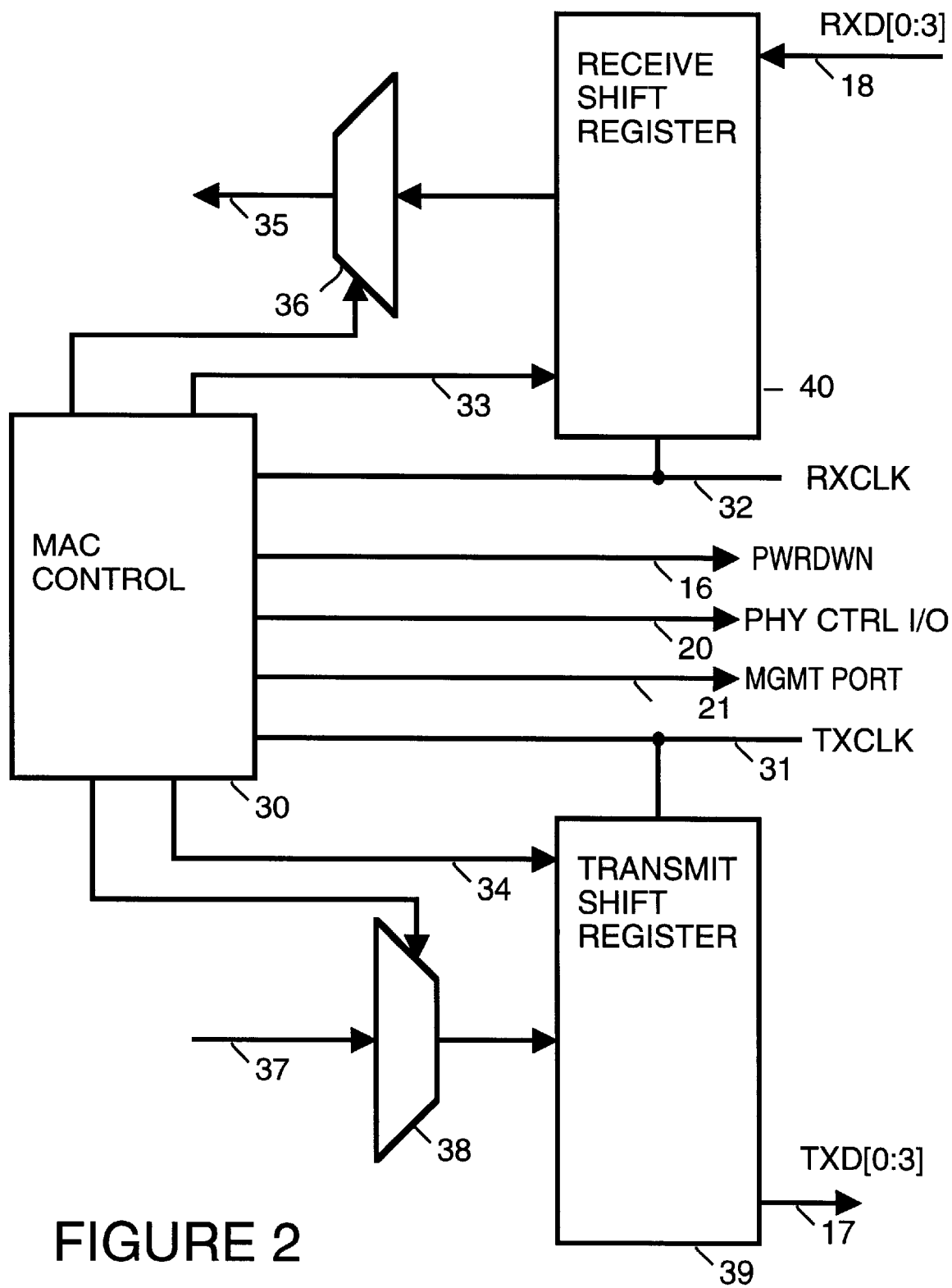
FIG. 2 is a simplified block diagram which shows an interface within the media access control integrated circuit shown in FIG. 1 in accordance with a preferred embodiment of the present invention.

FIG. 2 is a simplified block diagram which shows an interface within the media access control integrated circuit shown in FIG. 1 in accordance with a preferred embodiment of the present invention.

Figure 3:
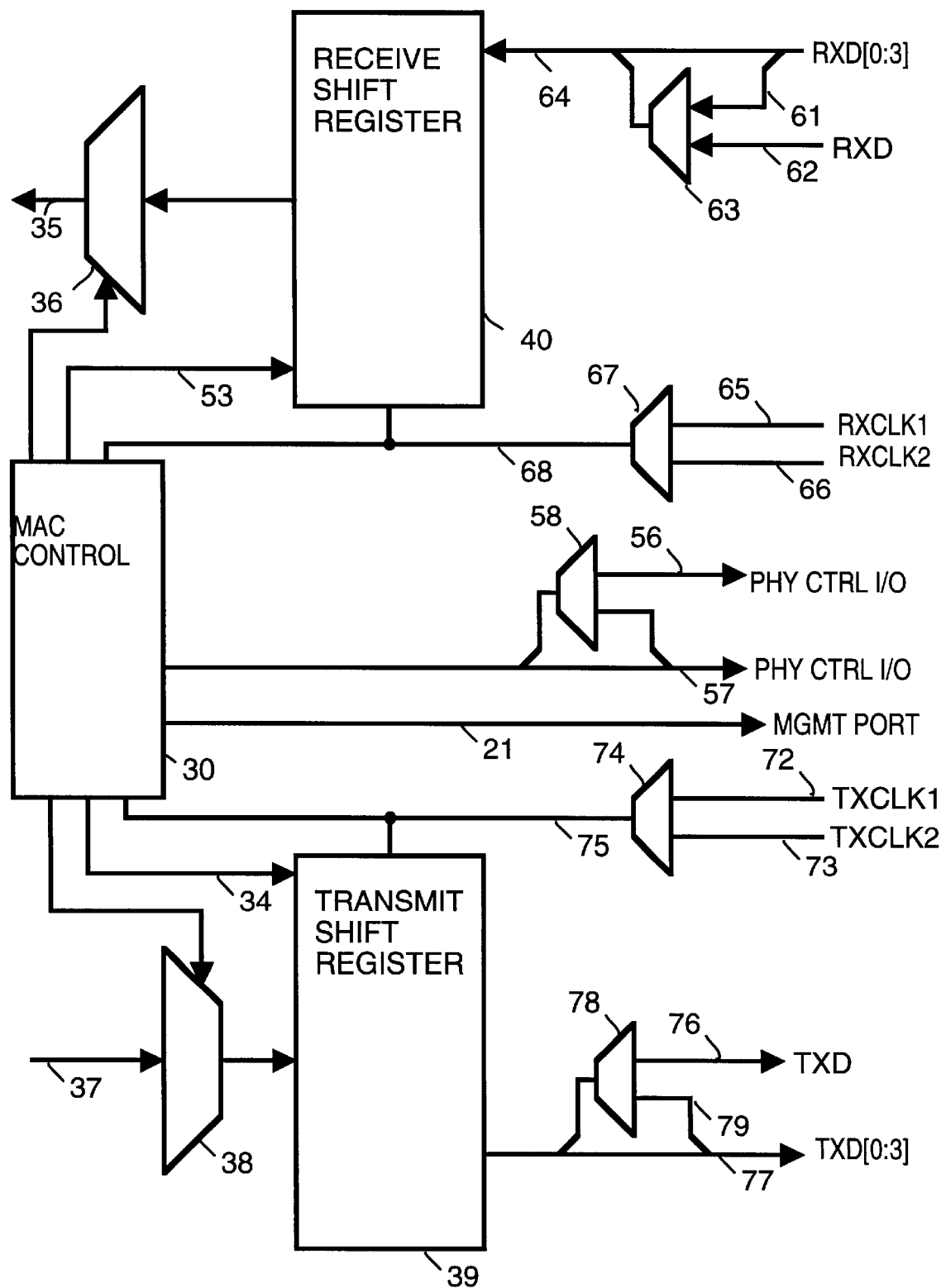
FIG. 3 is a simplified block diagram which shows an interface within the media access control integrated circuit shown in FIG. 1 in accordance with an alternate embodiment of the present invention.

FIG. 3 is a simplified block diagram which shows an interface within the media access control integrated circuit shown in FIG. 1 in accordance with an alternate embodiment of the present invention.

Figure 4:
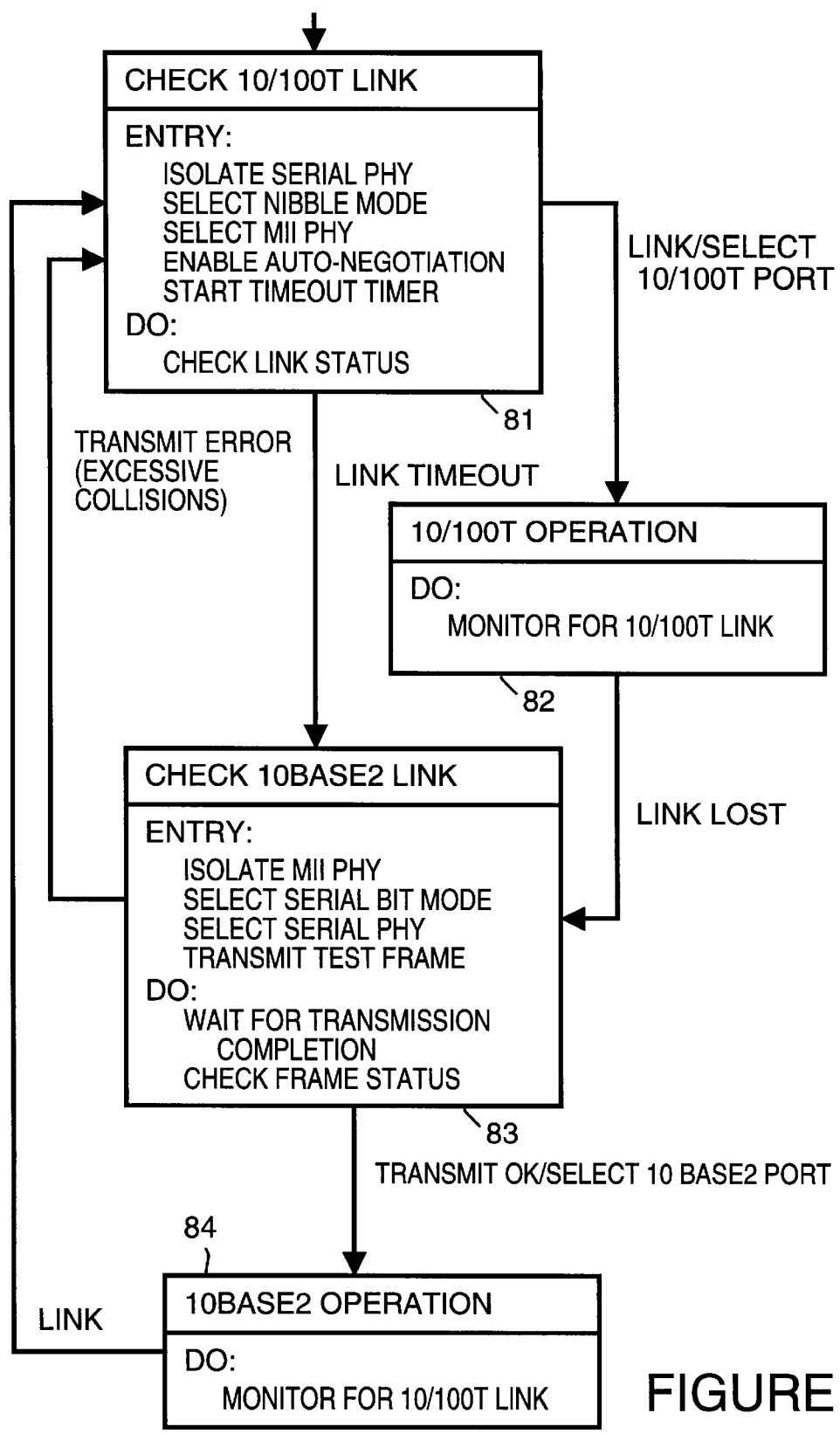
FIG. 4 is a simplified block diagram which shows a state machine for MAC control logic in accordance with a preferred embodiment of the present invention.

FIG. 4 is a simplified block diagram which shows a state machine or link control logic in accordance with a preferred embodiment of the resent invention.

DESCRIPTION OF THE PREFERRED EMBODIMENT

FIG. 1 is a simplified block diagram which shows a media access control (MAC) integrated circuit 11 connected to a serial physical sublayer (serial PHY) 12 and to a media independent interface physical sublayer (MII PHY) 13. Serial PHY 12 is a PHY chip which provides connectivity to an attachment unit interface (AUI) 14 (i.e., a 10Base2 port). For example, PHY 12 is a LXT908 PHY available from Level One Communications, Inc. Alternatively, serial PHY 12 is a serial PHY available from one of a number of other vendors.

Serial PHY 12 includes a power down (PWR DWN) input 121, a transmit data input 122, a receive data output 123, a receive clock/transmit clock 124 and physical control signal input/output (I/O) lines 125.

MII PHY 13 is a PHY chip which provides connectivity for an interface 15 which is 10T, 100T or another 10/100 megabit network. For example, MII PHY 13 is a LXT970 PHY available from Level One Communications, Inc. Alternatively, MII PHY 13 is an MII PHY available from one of a number of other vendors.

MII PHY 13 includes a four-bit transmit data input 132, a four-bit receive data output 133, a receive clock/transmit clock 134, physical control signal I/O lines 135, and an MII management port 136.

MAC 11 includes a serial power down output 111, a four-bit transmit data output 112, a four-bit receive data input 113, a receive clock/transmit clock 114, physical control signal input/output (I/O) 115 and MII management port 116.

Serial power down output 111 of MAC 11 is connected through line 16 to power down input 121 of serial PHY 12. Four-bit transmit data output 112 of MAC 11 is connected through lines 17 to four-bit transmit data input 132 of MII PHY 13. A single line 22 (TXD[0]) from lines 17 is split off and connected to transmit data input 122 of serial PHY 12.

Four-bit receive data input 113 of MAC 11 is connected through lines 18 to four-bit receive data output 133 of MII PHY 13. A single line 23 (RXD[0]) from lines 18 is split off and connected to receive data output 123 of serial PHY 12. Receive clock/transmit clock 114 of MAC 11 is connected through lines 19 to receive clock/transmit clock 124 of serial PHY 12 and to receive clock/transmit clock 134 of MII PHY 13.

Physical control signal I/O lines 115 of MAC 11 are connected through lines 20 to physical control signal I/O lines 135 of MII PHY 13. A subset of lines 24 of lines 20 are used to connect a subset of physical control signal I/O lines 115 of MAC 11 to physical control signal I/O lines 125 of serial PHY 12. MII management port 116 of MAC 11 is connected through line 21 to MII management port 136 of MII PHY 13.

In essence then, MAC 11 presents a MII interface to MII PHY 13. Using a subset of the MII interface, MAC 11 presents a serial interface to serial PHY 12.

Table 1 below sets out the MII signals and shows which of the MII signals are connected to and used by serial PHY 12.

TABLE 1

| MII Signals | Serial PHY Signals |
| --- | --- |
| MDIO | Not Connected |
| MDC | Not Connected |
| RXD[3] | Not Connected |
| RXD[2] | Not Connected |
| RXD[1] | Not Connected |
| RXD[0] | RXD |
| RX_DV | Not Connected |
| RX_CLK | RXCLK |
| RX_ER | Not Connected |
| TX_ER | Not Connected |
| TX_CLK | TXCLK |
| TX_EN | TXEN |
| TXD[0] | TXD |
| TXD[1] | Not Connected |
| TXD[2] | Not Connected |
| TXD[3] | Not Connected |
| COL | COL |
| CRS | CD |

FIG. 2 is a simplified block diagram which shows an interface within the MAC integrated circuit 11. To allow serial PHY 12 to be connected to the MII interface presented by MAC 11, MAC 11 must be able to isolate serial PHY 12 from the MII bus. MAC 11 also must be capable of handling different clock speeds and different data widths.

As shown by FIG. 2, within MAC 11, the receive and transmit channels are split into different sections. On the receive path, data is received into a receive shift register 40. RXCLK on a line 32 is used to clock receive shift register 40. Through a control line 33, MAC control 30 controls receive shift register 40. When receiving data from serial PHY 12, each clock signal clocks into receive shift register 40 one bit of data. When receiving data from MII PHY 13, each clock signal clocks into receive shift register 40 four bits of data. When receive shift register 40 has received a full byte of data, gate 36 forwards the byte of data into data path 35 of MAC 11 for further processing.

On the transmit path, eight bits of data are received from a data path 37 of MAC 11 into a transmit shift register 39 via a gate 38 controlled by Mac control 30. TXCLK on a line 31 is used to clock transmit shift register 39. Through a control line 34, MAC control 30 controls transmit shift register 39. When transmitting data to serial PHY 12, each clock signal clocks out of transmit shift register 39 one bit of data. When transmitting data to MII PHY 13, each clock signal clocks out of transmit shift register 39 four bits of data.

When operating in serial mode, TXCLK and RXCLK operate at 10 MHz. When operating in MII mode, TXCLK and RXCLK operate at 2.5 MHz (for 10T connections) or 25 MHz (for 100T connections).

MAC control 30 controls the mode in which MAC 11 operates. MAC control 30 takes advantage of power down (PWR DWN) input 121 of serial PHY 12 to isolate serial PHY 12 from the MII bus when MAC 11 is communicating with MII PHY 13. If there is no power down/tri-state capability in serial PHY 12, it is necessary to, in some other way, isolate serial PHY 12 from MAC 11 when performing data transactions with MII PHY 13.

For example, FIG. 3 shows a switch 63, a switch 67, a switch 58, a switch 74 and a switch 78 used to isolate a serial PHY without a power down capability from MAC 11. Lines 64 carry receive data RXD[0:3] from four-bit receive data output 133 of MII PHY 13. Switch 63 selects either RXD[0] from MII PHY 13 on line 61 or RXD on a line 62 from receive data output 123 of serial PHY 12, depending upon whether MAC 11 is communicating with serial PHY 12 or MII PHY 13.

Switch 67 selects either a receive clock signal from serial PHY 12 on receive clock (RXCLK1) line 65 or a receive clock signal from MII PHY 13 on receive clock (RXCLK2) line 66 for the receive clock signal on receive clock line 68.

Lines 57 carry control data for physical control signal I/O lines 135 of MII PHY 13. Switch 58 selects either the subset of physical control signal I/O lines 56 for serial PHY 12 or the corresponding subset of physical control signal I/O lines for MII PHY 13, depending upon whether MAC 11 is communicating with serial PHY 12 or MII PHY 13.

Switch 74 selects either a transmit clock signal from serial PHY 12 on transmit clock (TXCLK1) line 72 or a transmit clock signal from MII PHY 13 on a transmit clock (TXCLK2) line 73 for the transmit clock on transmit clock line 75.

Lines 77 carry transmit data TXD[0:3] to four-bit transmit data input 132 of MII PHY 13. Switch 78 selects either TXD[0] from MII PHY 13 on line 79 or TXD on a line 76 from transmit data input 122 of serial PHY 12, depending upon whether MAC 11 is communicating with serial PHY 12 or MII PHY 13.

FIG. 4 shows a link control state machine which controls MAC control 30 as well as MII PHY 13 and serial PHY 12. For example the state machine is implemented as firmware executed by a central processor. Alternatively, the link control state machine is implemented in hardware within MAC 11. Upon entering a check 10/100T link state 81, serial PHY 12 is isolated via power down control line 16 (as shown in FIG. 1) or comparable hardware (as shown in FIG. 3). MAC control 30 is then placed into nibble mode. Then MII PHY 13 (used for either 10T or 100T) is selected and auto-negotiation is enabled. This allows MII PHY 13 to establish a 10T or 100T link via interface 15. A link timer is then started to restrict the linking time to a finite period.

While in check 10/100T link state 81, MII PHY 13 is polled to determine whether a link has been established. If a link is established (link/select 10/100T port), then interface 15 is selected and a transition is made to a 10/100T operation state 82. However, if the link timer expires (link timeout) then instead a transition to a check 10Base2 link state 83 is made.

In 10/100T operation state 82, the 10/100T link is monitored. When in 10/100T operation state 82 the link is lost (link lost), 10Base2 link state 83 is entered.

Upon entering check 10Base2 link state 83, MII PHY 13 is isolated via MII management interface 136. MAC control 30 is then placed in the serial mode. Then serial PHY 12 is selected and a test frame is transmitted. The test frame is self-addressed at the MAC level, thereby insuring that another network device will not process it. The test frame is used to determine whether interface 14 (10Base2 port) is connected to a 10Base2 network. Once the test frame has been transmitted, the status of the test frame is checked. If the transmission was successful (i.e., the test frame was sent), then interface 14 is selected and a transition (transmit OK/select 10Base2) is made to a 10Base2 operation state 84. If, however, an error is encountered on the frame transmission, then a transition (transmit error) is made back to check 10/100T link state 81. The error condition in this case is excessive collisions on the transmission.

Since 10Base2 networks must be 50 ohm terminated, a 10Base2 port not connected to a network will encounter reflections during a transmission. These reflections cause MAC 11 to believe that collisions are being encountered on the network. After unsuccessfully transmitting a frame 16 times, Mac 11 gives up and indicates that an excessive collision error has occurred for the frame. While this could be a legitimate error due to heavy traffic on the network, it is unlikely to persist and an active 10Base2 port would be selected.

In the 10Base2 operating state 84, MII PHY 13 is periodically polled to determine whether a link has been established via interface 15 (the 10/100T port). If a link is established, then a transition to check 10/100T link state 81 occurs. In this manner communication using MII PHY 13 (i.e., via the 10/100T port) is given priority over communication using serial PHY 12 (i.e., via the 10Base2 port).

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A network node comprising:
   a serial physical sublayer (PHY) chip, comprising:
      a single bit transmit data input,
      a single bit receive data output, and
      serial PHY control signal input/output (I/O) lines;
   a parallel PHY chip, comprising:
      a multi-bit transmit data input,
      a multi-bit receive data output, and
      parallel PHY control signal I/O lines; and,
   a media access control (MAC) chip, comprising:
      a multi-bit transmit data output, the multi-bit transmit data output being coupled to the multi-bit transmit data input, and one bit of the multi-bit transmit data output being coupled to the single bit transmit data input, a multi-bit receive data input, the multi-bit receive data input being coupled to the multi-bit receive data output, and one bit of the multi-bit receive data input being coupled to the single bit receive data output, and parallel control signal I/O lines, the parallel control signal I/O lines being coupled to the parallel PHY control signal I/O lines.

2. A network node as in claim 1 wherein the serial PHY control signal I/O lines are coupled to a subset, but not all, of the parallel control signal I/O lines.

3. A network node as in claim 1, wherein the serial PHY chip includes:

isolation means for electrically isolating the single bit transmit data input, the single bit receive data output and the serial PHY control signal I/O lines when data is being transmitted between the parallel PHY chip and the MAC chip.

4. A network node as in claim 1 wherein the MAC chip additionally comprises:

a receive clock line on which is placed a receive clock signal; and, a receive shift register, coupled to the multi-bit receive data input, and to the receive clock signal;

wherein when the MAC chip receives data from the parallel PHY chip, the data is clocked into the receive shift register four bits at a time; and, wherein when the MAC chip receives data from the serial PHY chip, the data from the serial PHY chip is clocked into the receive shift register one bit at a time.

5. A network node as in claim 4 wherein when the MAC chip receives data from the parallel PHY chip, the receive clock signal has a first frequency, and when the MAC chip receives data from the serial PHY chip, the receive clock signal has a second frequency, the second frequency being different from the first frequency.

6. A network node as in claim 4 wherein the MAC chip additionally comprises:

a transmit clock line on which is placed a transmit clock signal; and, a transmit shift register, coupled to the multi-bit transmit data output, and to the transmit clock signal;

wherein when the MAC chip sends data to the parallel PHY chip, the data is clocked out of the transmit shift register four bits at a time; and, wherein when the MAC chip sends data to the serial PHY chip, the data sent to the serial PHY chip is clocked out of the transmit shift register one bit at a time.

7. A network node as in claim 1 wherein the MAC chip additionally comprises:

a transmit clock line on which is placed a transmit clock signal; and, a transmit shift register, coupled to the multi-bit transmit data output, and to the transmit clock signal;

wherein when the MAC chip sends data to the parallel PHY chip, the data is clocked out of the transmit shift register four bits at a time; and, wherein when the MAC chip sends data to the serial PHY chip, the data sent to the serial PHY chip is clocked out of the transmit shift register one bit at a time.

8. A network node as in claim 7 wherein when the MAC chip transmits data to the parallel PHY chip, the transmit clock signal has a first frequency, and when the MAC chip transmits data to the serial PHY chip, the transmit clock signal has a second frequency, the second frequency being different from the first frequency.

9. A network interface controller, comprising:

a multi-bit transmit data output, the multi-bit transmit data output being for connection to a multi-bit transmit data input of a parallel network interface, and a single bit of the multi-bit transmit data output being for connection to a single bit transmit data input of a serial network interface;

a multi-bit receive data input, the multi-bit receive data input being for connection to a multi-bit receive data output of the parallel network interface, and one bit of the multi-bit receive data input being for connection to a single bit receive data output of the serial network interface;

parallel control signal input/output (I/O) lines, the parallel control signal I/O lines being for connection to parallel network interface control signal I/O lines of the parallel network interface; and, isolation means for electrically isolating the single bit transmit data input and the single bit receive data output when data is being transmitted between the parallel network interface and the network interface controller.

10. A network interface controller as in claim 9 wherein a subset, but not all, of the parallel control signal I/O lines are also for connection to serial network interface control signal I/O lines of the serial network interface.

11. A network interface controller as in claim 9, additionally comprising:

a receive clock line on which is placed a receive clock signal; and, a receive shift register, coupled to the multi-bit receive data input, and to the receive clock signal;

wherein when the network interface controller receives data from the parallel network interface, the data is clocked into the receive shift register four bits at a time; and, wherein when the network interface controller receives data from the serial network interface, the data from the serial network interface is clocked into the receive shift register one bit at a time.

12. A network interface controller as in claim 9 wherein when the network interface controller receives data from the parallel network interface, the receive clock signal has a first frequency, and when the network interface controller receives data from the serial network interface, the receive clock signal has a second frequency, the second frequency being different from the first frequency.

13. A network interface controller, as in claim 9 additionally comprising:

a transmit clock line on which is placed a transmit clock signal; and, a transmit shift register, coupled to the multi-bit transmit data output, and to the transmit clock signal;

wherein when the network interface controller sends data to the parallel network interface, the data is clocked out of the transmit shift register four bits at a time; and, wherein when the network interface controller sends data to the serial network interface, the data sent to the serial network interface is clocked out of the transmit shift register one bit at a time.

14. A network interface controller as in claim 13 wherein when the network interface controller transmits data to the parallel network interface, the transmit clock signal has a first frequency, and when the network interface controller transmits data to the serial network interface, the transmit clock signal has a second frequency, the second frequency being different from the first frequency.

15. A method for using a network interface controller with both a parallel network interface and a serial network interface, comprising the steps of:

(a) connecting a multi-bit transmit data output of the network interface controller to a multi-bit transmit data input of the parallel network interface;

(b) connecting a single bit of the multi-bit transmit data output to a single bit transmit data input of a serial network interface;

(c) connecting a multi-bit receive data input of the network interface controller to a multi-bit receive data output of the parallel network interface;

(d) connecting one bit of the multi-bit receive data input to a single bit receive data output of the serial network interface;

(e) connecting parallel control signal input/output (I/O) lines of the network interface controller to parallel network interface control signal I/O lines; and, (f) electrically isolating the single bit transmit data input and the single bit receive data output when data is being transmitted between the parallel network interface and the network interface controller.

16. A method as in claim 15 additionally comprising the following step:

(g) connecting a subset, but not all, of the parallel control signal I/O lines to serial network interface control signal I/O lines of the serial network interface.

17. A method as in claim 15, additionally comprising the following steps:

(g) when the network interface controller receives data from the parallel network interface, clocking the data into a receive shift register four bits at a time; and, (h) when the network interface controller receives data from the serial network interface, clocking the data from the serial network interface into the receive shift register one bit at a time.

18. A method as in claim 17 wherein in steps (g) and (h), a frequency of a receive clock signal used to clock data into the receive shift register is varied based on whether the network interface controller receives data from the serial network interface or receives data from the parallel network interface.

19. A method as in claim 15, additionally comprising the following steps:

(g) when the network interface controller sends data to the parallel network interface, clocking the data out of a transmit shift register four bits at a time; and, (h) when the network interface controller sends data to the serial network interface, clocking the data out of the transmit shift register one bit at a time.

20. A method as in claim 19 wherein in steps (g) and (h), a frequency of a transmit clock signal used to clock data out of the transmit shift register is varied based on whether the network interface controller sends data to the serial network interface or sends data to the parallel network interface.

* * * * *